United States Patent
Fries

(10) Patent No.: US 9,501,124 B2
(45) Date of Patent: Nov. 22, 2016

(54) VIRTUAL MACHINE PLACEMENT BASED ON POWER CALCULATIONS

(75) Inventor: Robert M. Fries, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1951 days.

(21) Appl. No.: 12/125,905

(22) Filed: May 22, 2008

(65) Prior Publication Data

US 2009/0293022 A1  Nov. 26, 2009

(51) Int. Cl.
- G06F 9/455 (2006.01)
- G06F 1/32 (2006.01)
- G06F 1/20 (2006.01)
- G06F 9/50 (2006.01)
- G06Q 10/04 (2012.01)

(52) U.S. Cl.
CPC .......... *G06F 1/3203* (2013.01); *G06F 1/206* (2013.01); *G06F 9/45533* (2013.01); *G06F 9/5088* (2013.01); *G06F 9/5094* (2013.01); *G06Q 10/04* (2013.01); *Y02B 60/1275* (2013.01); *Y02B 60/142* (2013.01); *Y02B 60/146* (2013.01); *Y02B 60/148* (2013.01); *Y02B 60/162* (2013.01)

(58) Field of Classification Search
None
See application file for complete search history.

(56) References Cited

U.S. PATENT DOCUMENTS

| | | | |
|---|---|---|---|
| 6,907,419 B1 * | 6/2005 | Pesola et al. | |
| 7,051,215 B2 | 5/2006 | Zimmer et al. | |
| 7,203,944 B1 | 4/2007 | van Rietschote et al. | |
| 7,225,441 B2 | 5/2007 | Kozuch et al. | |
| 7,290,152 B2 | 10/2007 | Dubinsky | |
| 7,644,148 B2 * | 1/2010 | Ranganathan et al. | 709/223 |
| 7,779,424 B2 * | 8/2010 | Cherkasova | G06F 11/3423 709/223 |
| 2002/0099753 A1 | 7/2002 | Hardin et al. | |
| 2004/0010787 A1 | 1/2004 | Traut et al. | |
| 2005/0060590 A1 | 3/2005 | Bradley et al. | |
| 2005/0251802 A1 | 11/2005 | Bozek et al. | |
| 2006/0294524 A1 * | 12/2006 | Vega | 718/104 |
| 2007/0112999 A1 | 5/2007 | Oney et al. | |
| 2007/0192641 A1 * | 8/2007 | Nagendra et al. | 713/320 |
| 2008/0065919 A1 * | 3/2008 | Hatasaki et al. | 713/324 |
| 2009/0204826 A1 * | 8/2009 | Cox et al. | 713/320 |

OTHER PUBLICATIONS

Grit, et al., "Virtual Machine Hosting for Networked Clusters: Building the Foundations for "Autonomic" Orchestration", Proceedings of the 2nd International Workshop on Virtualization Technology in Distributed Computing, IEEE Computer Society, 2006, pp. 1-8.

Reinhardt, "Cooperative, Energy-Aware Scheduling of Virtual Machines", Aug. 5, 2005, pp. 36.

Hermenier, et al., "Power Management in Grid Computing with Xen", Proceedings of 2006 on XEN in HPC Cluster and Grid Computing Environments (XHPC06), No. 4331, Springer-Verlag Berlin Heidelberg, 2006, p. 407-416.

* cited by examiner

Primary Examiner — Gregory A Kessler

(74) Attorney, Agent, or Firm — Henry Gabryjelski; Micky Minhas

(57) ABSTRACT

An optimized placement of virtual machines may be determined by optimizing an energy cost for a group of virtual machines in various configurations. For various hardware platforms, an energy cost per performance value may be determined. Based on the performance usage of a group of virtual machines, a total power cost may be determined and used for optimization. In some implementations, an optimized placement may include operating a group of virtual machines in a manner that does not exceed a total energy cost for a period of time.

20 Claims, 3 Drawing Sheets

VIRTUAL MACHINE PLACEMENT BASED ON POWER CALCULATIONS

BACKGROUND

Virtual machines are software implementations of a computer that execute programs like a real or physical machine. Virtual machines may be used to process various applications, provide services, or perform various functions. In many implementations, separate virtual machines may be used to perform specific functions. Because the virtual machines are separated, the services performed on each virtual machine may not conflict with each other and may be managed as separate entities, even though in some cases, two or more virtual machines may be executed on a single hardware platform.

One of the features of a virtual machine is that it may be paused, saved, and resumed. When a virtual machine is paused, it may be moved from one hardware platform to another. By moving virtual machines from one hardware platform to another, virtual machines may be consolidated or distributed as the loads on the virtual machines contract and expand.

SUMMARY

An optimized placement of virtual machines may be determined by optimizing an energy cost for a group of virtual machines in various configurations. For various hardware platforms, an energy cost per performance value may be determined. Based on the performance usage of a group of virtual machines, a total power cost may be determined and used for optimization. In some implementations, an optimized placement may include operating a group of virtual machines in a manner that does not exceed a total energy cost for a period of time.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
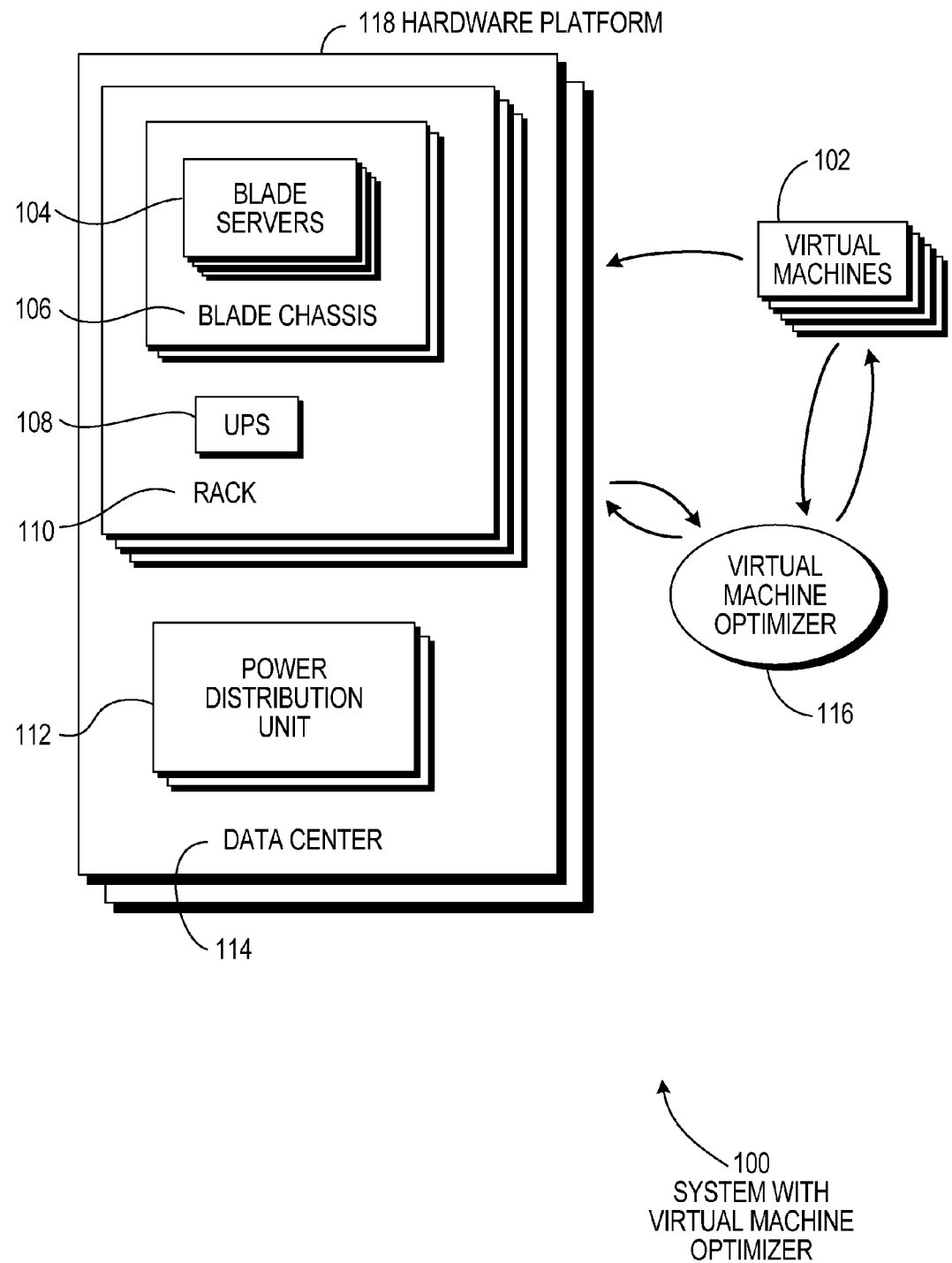
FIG. 1 is a diagram illustration of an embodiment showing a system with a virtual machine optimizer.

Virtual machines may be configured onto a hardware platform in a manner that maximizes power usage. In many cases, hardware devices may have different levels of efficiency in terms of performance per power usage. By factoring the hardware capabilities along with a predicted usage for a set of virtual machines, an optimized hardware configuration may be selected and implemented.

By configuring the virtual machines onto a subset of the available hardware, some hardware may be placed in a reduced power mode or shut off completely. Further, by optimizing using the performance per power usage, a data center's cooling costs may be reduced or otherwise managed.

In some cases, a data center may determine a maximum amount of power usage for a given period of time. An example may be in response to a power company's service level agreement for power consumption. Some power companies may give a price break or have some other agreement when a power consumer limits power use during high demand times.

In response to a limit on power consumption, the quality of service for the virtual machines may be adjusted to enable a hardware configuration that meets the power consumption limit.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system with a virtual machine optimizer 116. The virtual machine optimizer 116 may optimize the placement and operation of a set of virtual machines 102 on a hardware platform 118. The virtual machine optimizer 116 may take into account various performance factors and the power consumed per performance factor for various subsets of the hardware platform 118.

The diagram of FIG. 1 illustrates functional components of a system. In some cases, the component may be a hardware component, a software component, or a combination of hardware and software. Some of the components may be application-level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

The virtual machine optimizer 116 may determine an optimized subset of hardware on which to operate the virtual machines 102. In many embodiments, the workload of a data center may vary over the course of a day. For example, a data center used to process business information may be busiest during the normal business hours of the geographic region it serves, but may be much less busy during off-peak hours, over holidays, and during weekends.

In many cases, a data center may be configured with many different devices, each having different capabilities and different power consumption for those capabilities. For example, an older computer may have a slow processor that is less efficient, meaning that its power consumption per SPECint, millions of instructions per second (MIPS), or some other measure. A newer, more efficient processor may be faster but consume the same power, or may be the same speed but consume less power and thus have a lower power consumption per SPECint. The performance parameter in this case is computing power, and the power consumption may be measured in watts per SPECint, for example.

Each virtual machine 102 may have a predicted demand for a performance factor in order to meet a quality of service specification. For example, a virtual machine that is computationally intensive may consume a predictable number of SPECints. A power consumption calculation in watts may multiply the number of SPECints demanded verses the number of watts per SPECint.

In order to properly place the virtual machines 102 onto a hardware platform 118, the virtual machine optimizer 116 may determine hardware configurations that enable a quality of service to be met. Some virtual machines 102 may be computationally intensive, while other virtual machines may use different amounts of storage access, network access, or memory access.

Each hardware component may be measured in terms of the power consumption per performance factor and the overall capabilities per performance factor, with the performance factors including processor, storage, network, and memory factors. Similarly, each virtual machine may be analyzed to determine the expected load for each performance factor. By first analyzing the capabilities of the hardware platforms, various configurations of a subset of the hardware devices may be identified. Each hardware configuration may be analyzed to determine an overall power cost, and an optimized configuration may be selected.

Such an analysis may be simplified by using one performance factor, such as a processor factor, while other analyses may use two or more performance factors in the computation.

The performance factors may be any characteristic that may be measured for the hardware components and may be estimated for a virtual machine. Examples for processor-related performance factors may include processor instructions, parallel processing capabilities, integer processing capabilities, real number computations, and other measurable elements. Examples for storage access may include data throughput, storage capacity, seek time, burst capacity, or other factors. Examples for memory access may include random access memory capacity, memory response time, or other factors. Examples of network access may include minimum and maximum bandwidth, network variability, network routing time, or other factors.

In a typical deployment of a large data center, several blade servers 104 may be configured within a blade chassis 106. Two or more blade chassis 106 and an uninterruptable power supply 108 may make up a rack 110. A data center 114 may contain many racks 110 as well as several power distribution units 112.

When optimizing a hardware configuration for executing a set of virtual machines, it may be advantageous to use configurations where an entire blade chassis, rack, or power distribution unit may be turned off or operated in a reduced power mode. In some embodiments, a set of virtual machines may be consolidated across data centers so that one or more data centers may be powered down.

An optimized hardware configuration may generally tend to have the maximum number of devices and power distribution elements turned off or operated in a reduced power mode.

Figure 2:
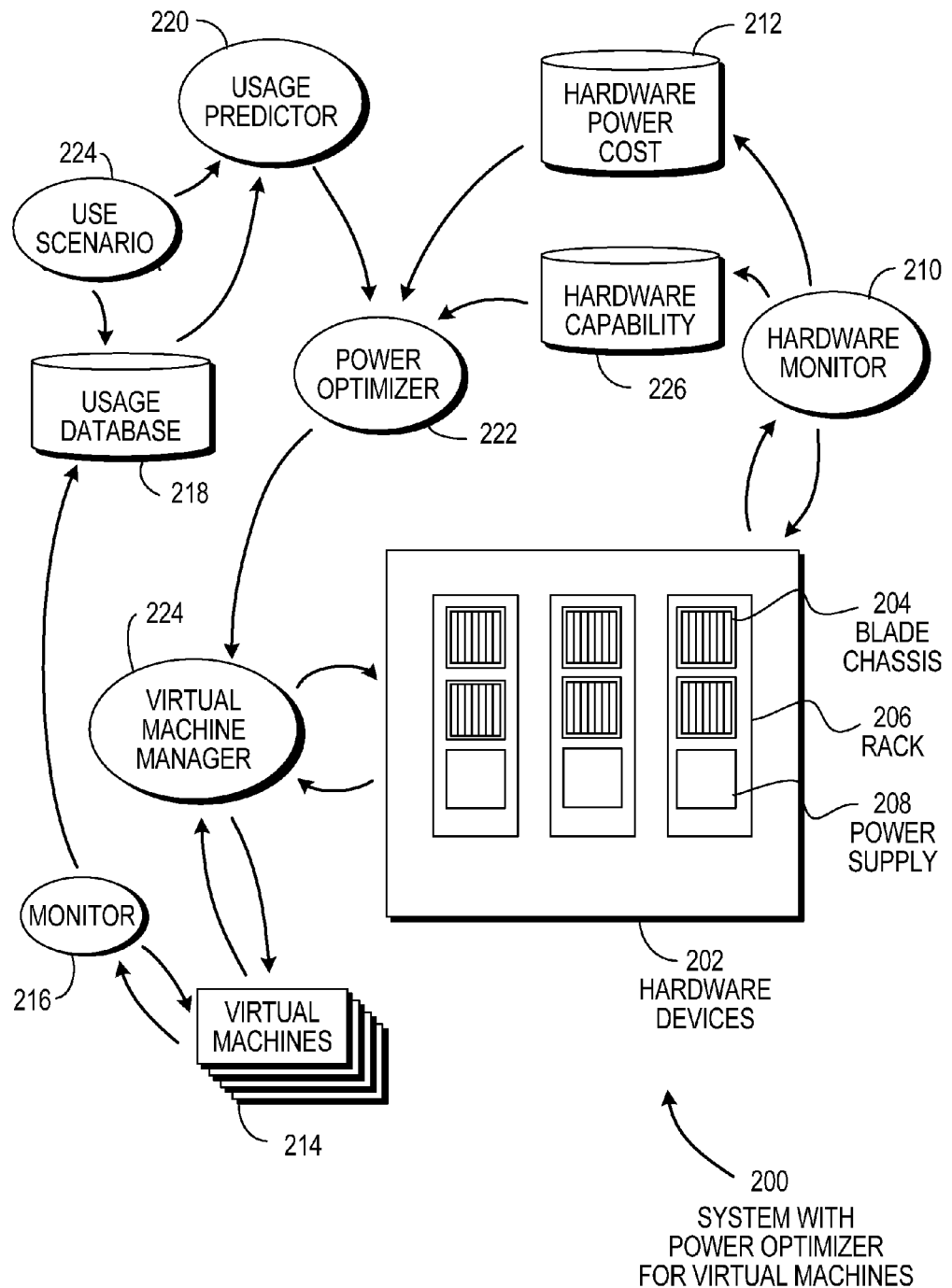
FIG. 2 is a diagram illustration of an embodiment showing a system with power optimizer for virtual machines.

FIG. 2 is a diagram of an embodiment 200 showing a system with a power optimizer for virtual machines. The power optimizer may determine an optimized hardware configuration for a given usage of a set of virtual machines. The power optimizer may calculate the power cost for different hardware configurations and select an optimized hardware configuration.

The diagram of FIG. 2 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

A set of hardware devices 202 may include several blade servers mounted in blade chassis 204, and several blade chassis may be mounted in racks 206, each of which may include a power supply 208. A data center may include many racks, and some data centers may include many hundreds of racks. Some data centers may have multiple power distribution units that may power several racks.

The hardware configurations described in this specification are for example and discussion purposes, and selected to illustrate the concepts of a virtual machine optimizer. Other embodiments may use different hardware systems arranged in many different manners.

A hardware monitor 210 may analyze the various hardware components and populate a hardware power cost database 212. The hardware monitor 210 may periodically measure the power usage of individual hardware components so that power calculations may be made using data stored in the hardware power cost database 212.

The hardware monitor 210 may also monitor various performance capabilities or may monitor the status of hardware components. The hardware capabilities may be stored in a hardware capability database 226.

In many embodiments, a hardware capability database 226 may be populated by device specifications. For example, a new blade server or other computer may be purchased with a set of specifications for various performance factors. Those performance factors may be loaded into the hardware capability database 226. Over time, the hardware monitor 210 may measure actual performance of the hardware components and update the hardware capability database 226.

When the virtual machines 214 are operational, a monitor 216 may monitor the usage of the various performance factors and store the usage in a usage database 218. The usage database 218 may contain usage statistics for a virtual machine in various use scenarios 224. An example of two use scenarios may be the operation of a virtual machine during a peak demand and during a period of low demand.

A usage predictor 220 may apply a use scenario 224 to determine the predicted usage of various performance factors by the virtual machines 214. The power optimizer 222 may use output from the usage predictor 220 and the hardware capability database 226 to generate a group of hardware configurations that may meet the use scenario. Each hardware configuration may be analyzed using the power cost database 212 to calculate a power cost and determine an optimized hardware configuration.

When an optimized hardware configuration is determined, the virtual machine manager 224 may move the virtual machines onto the proper hardware components and operate the virtual machines. Any devices that are unused may be turned off or operated in a reduced power mode.

In many embodiments, a quality of service may be used to determine a use scenario 224. Many data centers may have periods of high demand and periods of low demand. As such a period begins, a use scenario 224 may define a quality of service that may be delivered by the group of virtual machines 214. The use scenario and quality of service may be used to define the amount of performance factor resources that may be used by each of the virtual machines 214.

Figure 3:
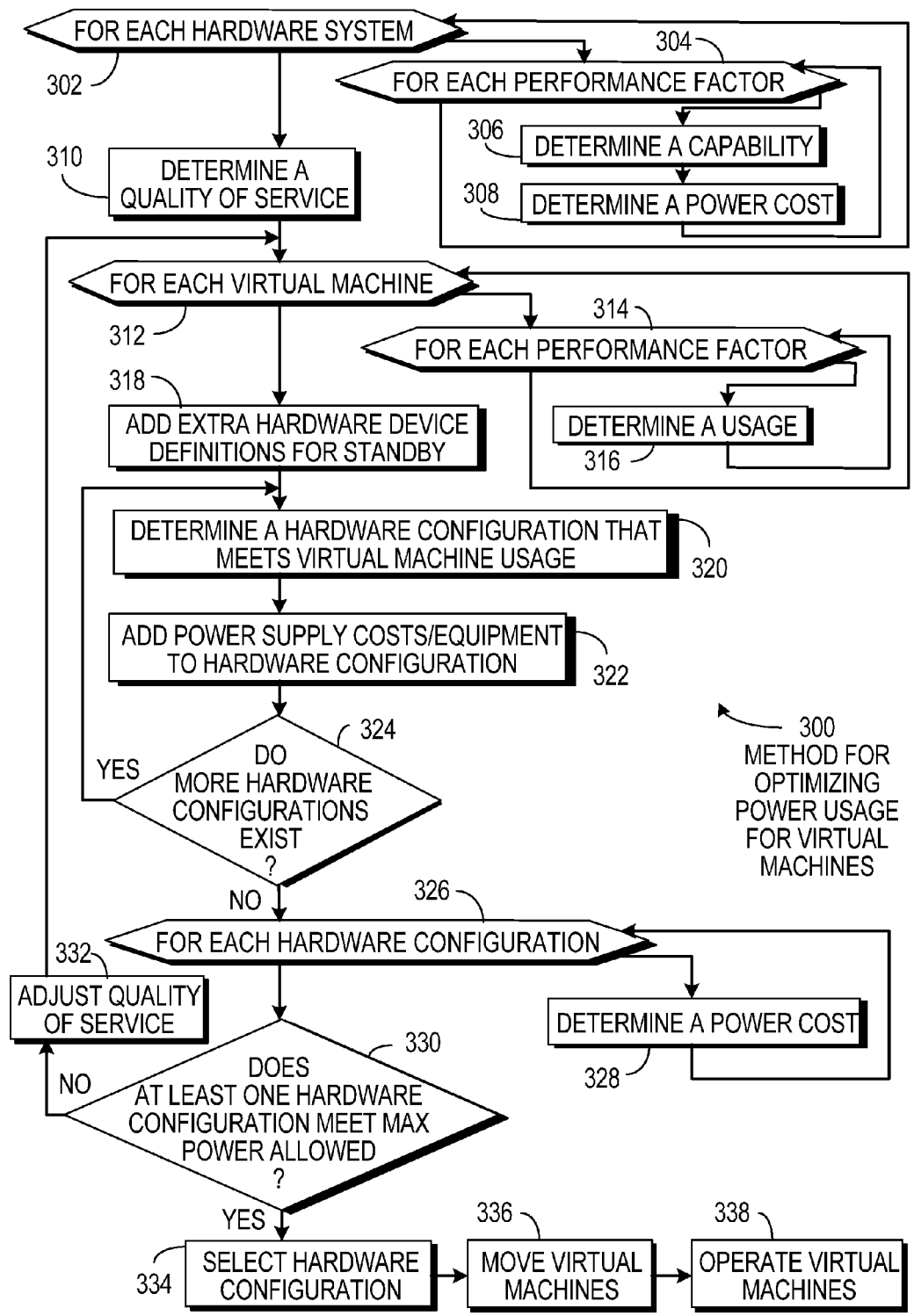
FIG. 3 is a flowchart illustration of an embodiment showing a method for optimizing power usage for virtual machines.

FIG. 3 is a flowchart illustration of an embodiment 300 showing a method for optimizing power usage for virtual machines. Embodiment 300 illustrates a method for analyzing hardware systems, analyzing virtual machines, and generating hardware configurations. The hardware configurations may be analyzed using power usage and one may be selected and implemented.

The hardware configuration may be selected to use less than a maximum amount of power. The resource loading of a virtual machine may be determined given a quality of service factor, and the quality of service factor may be adjusted to achieve a maximum amount of power used.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

For each hardware system in block 304, each performance factor is analyzed in block 306. For each performance factor in block 306, a capability may be determined in block 306 and a power cost may be determined in block 308.

A hardware system of block 304 may be a device on which a virtual machine may be run. In a data center, a hardware system may be a server or other computational device. Such servers may be stand-alone servers, blade servers, or may have any other physical architecture.

The performance factors of block 306 may be any factor that may be used for matching virtual machines to hardware platforms or devices on which the virtual machines may be executed. In many cases, the performance factors may relate to processor capabilities, storage capabilities, memory capabilities, and network capabilities.

The capability determined in block 306 may be the amount of the performance factor that is able to be used by a virtual machine. For example, a server may have a specific number of instructions per second that it can perform, or may have a certain amount of available random access memory.

The power cost in block 308 may be the power used by the performance factor. In some embodiments, a power cost may be associated with individual performance factors. For example, a blade server may have 30 SPECints of computational capabilities and the blade server may consume 15 watts of power just for the processing. The server may also have a storage system that consumes 5 watts of power and has 200 gigabytes of capacity. The processor may have separately measurable power consumption from the storage system.

In other embodiments, a power cost may be associated with a single hardware device. For example, a blade server may have a power consumption of 15 watts of power, but may have 30 SPECints of computational capabilities and 4 gigabytes of random access memory. In such an example, the power cost may not be able to be allocated to individual performance factors.

Each embodiment may have different metrics of performance and different mechanisms for categorizing and classifying capabilities of the hardware devices. In many cases, the performance factors monitored and measured for the hardware may be also estimated and monitored for the virtual machines.

The blocks 302 through 308 may be performed independently from the remaining blocks of embodiment 300. In some cases, blocks 302 through 308 may be performed on a one-time basis, while in other cases, blocks 302 through 308 may be performed on a continual or periodic basis as a background process.

In some embodiments, the steps of determining a capability in block 306 and determining a power cost in block 308 may be performed as part of a status and performance monitoring system.

A quality of service may be determined in block 310. The quality of service may be an expected level of demand for a set of virtual machines.

For each virtual machine in block 312, each performance factor may be analyzed in block 314. For each performance factor in block 314, a usage may be determined in block 316.

In many embodiments, the performance factor of block 314 may correspond with the performance factors of block 304. In some embodiments, a single performance factor may be used to select an optimized hardware configuration. In some such embodiments, a processor factor may be selected. In other embodiments, two or more performance factors may be used.

The choice of which performance factors and how many performance factors to use may vary with different embodiments. In a case where many or all of the hardware devices have a similar capability, the performance factor for that capability may not affect the outcome of an analysis. Thus, the performance factor may be omitted.

In embodiments where the hardware capabilities vary from one hardware device to another, a performance factor for that capability may strongly affect analyses and thus may be included. Performance factors for capabilities that tend to be gating or limiting items on overall performance are also likely candidates for inclusion.

Some embodiments may have servers or other hardware devices with limited network connectivity or throughput and may operate applications on the virtual machines that fully utilize the limited network connectivity. In such a case, network connectivity may be used as a performance factor. If the same set of hardware devices were operating virtual machines that used much less network connectivity, another performance factor may be selected.

The usage of the performance factors may vary based on the quality of service selected in block 310. In a case where a quality of service is low, a virtual machine may use significantly less processor power, for example, and when the virtual machine is operating with a high level of service.

After gathering the expected usage of the performance factors for the virtual machines in block 312, some extra hardware devices may be defined in block 318 for standby operations. In block 318, the extra hardware devices may be devices that may not have a virtual machine operating on them but may be operational for redundancy, hot swapping, or for use if a sudden surge in load occurs.

A hardware configuration may be determined in block 320 that may meet the virtual machine usage. The hardware configuration of block 320 may match the hardware capabilities with the virtual machine usage of those capabilities.

For the hardware configuration of block 320, power supply costs and equipment may be added to the configuration in block 322. The power supply costs may include costs and power consumption of blade server chassis power supplies, rack power supplies, power distribution units, and other overhead power consumption for the hardware configuration.

If more hardware configurations may exist in block 324, the process may repeat back to block 320. In some embodiments, several candidate hardware configurations may be generated. In some cases, several hundred of configurations may be generated if every possible combination is created.

In some embodiments, a set of heuristics, rules, or algorithms may be used to generate fewer hardware configurations to analyze.

For each hardware configuration in block 326, a power cost may be calculated in block 328. The power calculation may sum the power distribution components and calculate the power usage by the servers or other hardware components that are utilized in the hardware configuration.

If none of the hardware configurations meet a maximum power setting in block 330, the quality of service factor may be adjusted in block 332 and the process may return to block 312 for another try.

The decision point of block 330 may be used when a maximum power level is defined for a data center, for example. In order to meet a maximum power usage, a quality of service may be set to a low level and virtual machines may be consolidated into a subset of the available equipment. The unused equipment may be turned off or operated in a low power mode during the period when a maximum power level is imposed.

If at least one hardware configuration is under the maximum power level of block 330, a hardware configuration may be selected in block 334. In many cases, the hardware configuration may be selected by analyzing the power cost calculated in block 328 and selecting the lowest power cost. In some cases, other factors may be included in the selection process along with the power cost factor.

After the hardware configuration is selected in block 334, the virtual machines may be moved to the hardware devices selected for use in block 336. The virtual machines may be operated in block 338 using the hardware configuration.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:

for each of a plurality of hardware systems, determining a power cost per unit of measure of a hardware capability for each one of a set of two or more hardware capabilities, and storing said power cost per unit of measure of said hardware capability in a power cost database;

for each of a plurality of virtual machines, determining a usage statistic for each said hardware capability of said set of two or more hardware capabilities and applying a usage scenario to determine a usage prediction based on said usage statistic for each said hardware capability by each of said plurality of virtual machines, the usage statistic for each said hardware capability comprising a measure of an amount of each said hardware capability used by each of the plurality of virtual machines; and determining an optimized placement for each of said plurality of virtual machines using a subset of said plurality of hardware systems, said optimized placement being determined at least in part using a total power cost based on each said hardware capability from said power cost database and said usage prediction.

2. The method of claim 1, said hardware capability comprising at least one of a group of hardware capabilities composed of:
   processor usage;
   storage usage;
   network usage; and
   memory usage.

3. The method of claim 2, said hardware capability comprising two or more of said hardware capabilities in said group of hardware capabilities.

4. The method of claim 1, said plurality of hardware systems comprising one of a group of hardware systems composed of:
   a processor;
   a server;
   a blade server;
   a blade enclosure;
   a rack power supply;
   a power distribution unit; and
   a datacenter.

5. The method of claim 4, said plurality of hardware systems comprising at least two or more hardware systems in said group of hardware systems.

6. The method of claim 1, said optimized placement being determined by a method comprising:
   determining a maximum power usage; and
   selecting a virtual machine placement configuration that does not exceed said maximum power usage.

7. The method of claim 6, at least one of said plurality of virtual machines being identified to operate at less than full capacity.

8. The method of claim 1, said usage prediction being determined based on a predicted virtual machine demand.

9. The method of claim 8, said optimized placement being determined by a method comprising:
   identifying a plurality of hardware configuration sets capable of meeting said predicted virtual machine demand;
   calculating a power cost for each of said plurality of hardware configuration sets; and
   selecting one of said hardware configuration sets based at least in part on said power cost.

10. The method of claim 1, said optimized placement being determined using a power allocation for at least one spare hardware system.

11. The method of claim 1 further comprising:
    monitoring said power cost per unit of measure of said hardware capability to determine said power cost per hardware capability.

12. The method of claim 1 further comprising:
    moving at least one of said plurality of virtual machines to organize said plurality of virtual machines in accordance with said optimized placement.

13. A system comprising:
    a hardware platform;
    a database of power cost per unit of measure of a hardware capability for each one of a set of two or more hardware capabilities, for each of a plurality of hardware systems;
    a usage predictor configured to estimate usage of each of a plurality of virtual machines for said hardware capability, the usage comprising a measure of an amount of said hardware capability used by each of the plurality of virtual machines; and
    a power optimizer operating on said hardware platform and configured to determine an optimized placement for said plurality of virtual machines using a subset of said plurality of hardware systems, said optimized placement being determined at least in part using a total power cost based on each said hardware capability from said database of power cost and said usage estimated for each of said plurality of virtual machines for said hardware capability by said usage predictor.

14. The system of claim 13 further comprising:
    a monitoring system configured to monitor at least one of said plurality of hardware systems and determine said power cost per unit of measure of the hardware capability.

15. The system of claim 13 further comprising:
    a usage database populated by a usage history of said plurality of virtual machines, said usage predictor further configured to reference said usage database.

16. The system of claim 15 further comprising:
    a usage monitor configured to monitor usage of said hardware capability by at least one of said plurality of virtual machines and store said usage in said usage database.

17. The system of claim 13, said optimized placement being determined at least in part by two hardware capabilities.

18. The system of claim 13 further comprising:
    a virtual machine manager configured to move at least one of said plurality of virtual machines in accordance with said optimized placement.

19. A method comprising:
    for each of a plurality of hardware systems, determining power cost per unit of measure for at least two hardware capabilities, and storing said power cost per unit of measure for said at least two hardware capabilities in a power cost database;
    for each of a plurality of virtual machines, determining a usage statistic for each of said at least two hardware capabilities and applying a usage scenario to determine a usage prediction based on said usage statistic for each said at least two hardware capabilities by each of said plurality of virtual machines, the usage statistic for each said at least two hardware capabilities comprising a measure of an amount of each said at least two hardware capabilities used by each of the plurality of virtual machines; and
    determining an optimized placement for each of said plurality of virtual machines using a subset of said plurality of hardware systems, said optimized placement being determined at least in part using a total power cost based on each said two hardware capabilities of said hardware systems from said power cost database and said usage prediction for each of said plurality of virtual machines.

20. The method of claim 19 further comprising:
    moving at least one of said plurality of virtual machines to organize said plurality of virtual machines in accordance with said optimized placement.

* * * * *